(12) United States Patent  (10) Patent No.: US 7,846,359 B2
Crawford  (45) Date of Patent: Dec. 7, 2010

(54) MOULDING METHOD AND APPARATUS

(75) Inventor: David Barry Crawford, Sunningdale (ZA)

(73) Assignee: Lomold Corporation NV, Willemstad, Curacao (AN)

( * ) Notice: Subject to any disclaimer, the term of this patent is extended or adjusted under 35 U.S.C. 154(b) by 50 days.

(21) Appl. No.: 12/091,702

(22) PCT Filed: Oct. 26, 2006

(86) PCT No.: PCT/IB2006/003095

§ 371 (c)(1),
(2), (4) Date: Oct. 14, 2008

(87) PCT Pub. No.: WO2007/049146

PCT Pub. Date: May 3, 2007

(65) Prior Publication Data

US 2009/0218709 A1    Sep. 3, 2009

Related U.S. Application Data

(63) Continuation-in-part of application No. 11/258,011, filed on Oct. 26, 2005, now abandoned.

(51) Int. Cl.
*B29C 45/76* (2006.01)
(52) U.S. Cl. ............ 264/40.4; 264/328.18; 264/328.19; 425/147; 425/561
(58) Field of Classification Search ........................ None
See application file for complete search history.

(56) References Cited

U.S. PATENT DOCUMENTS

| 2,505,540 | A |   | 4/1950  | Goldhard |
|-----------|---|---|---------|----------|
| 3,847,525 | A |   | 11/1974 | Bielfeldt et al. |
| 6,343,920 | B1 | * | 2/2002 | Terasaki et al. ............. 425/143 |
| 6,464,910 | B1 |   | 10/2002 | Smorgon et al. |
| 6,630,085 | B1 |   | 10/2003 | Bielich et al. |

FOREIGN PATENT DOCUMENTS

| EP | 1090733 A1 | 4/2001 |
|----|------------|--------|
| JP | 7-068601 A1 | 3/1995 |
| WO | WO 99/00237 A1 | 1/1999 |

* cited by examiner

*Primary Examiner*—Monica A Huson
(74) *Attorney, Agent, or Firm*—Miles & Stockbridge P.C.

(57) ABSTRACT

A method and apparatus are provided for moulding an article by feeding molten plastics material into a metering cavity (16), feeding a predetermined quantity of the material from the metering cavity into a mould cavity via a transition passage (26) adjacent the mould cavity and urging the molten plastics material from the transition passage into the mould cavity with a working stroke of a packing piston (24), until the packing piston closes a port (28) defined between the transition passage and the mould cavity and a leading face (32) of the packing piston forms part of the peripheral wall of the mould. Less than ninety percent of the mould cavity is filled with the molten plastics material when the packing piston starts its working stroke and the packing piston starts its working stroke while molten plastics material is still being fed from the metering cavity.

20 Claims, 2 Drawing Sheets

MOULDING METHOD AND APPARATUS

CROSS-REFERENCE TO RELATED APPLICATION

This application is a continuation-in-part of application Ser. No. 11/258,011 filed Oct. 26, 2005.

FIELD OF THE INVENTION

This invention relates to a moulding method and apparatus that has particular application in moulding of plastics materials.

BACKGROUND TO THE INVENTION

In a conventional injection moulder, synthetic plastic is heated to a molten state and the molten plastics material is then forced at high pressure, through gates, sprues and runners to a mould cavity.

The rates at which the mould cavities can be filled are limited by the rate at which the molten plastics material can flow through the narrow sprues, runners and gates. The molten plastics material has to be fed to the mould cavity at high pressures, which are costly to apply and which require substantial structural strength of the mould, feed equipment, etc. These disadvantages can be overcome by increasing the cross sections of the passages via which the molten plastics material is fed to the mould, which also allows molten plastics material with inclusions such as long fibres, particulate matter from recycled plastics, or the like, to be used. With increased cross sections of the feed passages, lower feed pressures are required.

However, large cross sectional feeds to mould cavities have the disadvantage that the port where the feed enters the mould, needs to be closed off when the molten plastics material is allowed to freeze in the mould. This can be achieved by accumulating the molten plastics material needed to fill the mould cavity, in a cylindrical holding chamber adjacent the mould and closing the port with a piston, the leading face of which becomes part of the peripheral wall of the mould cavity, when closed. However, in apparatus of this type, the holding chamber is open to the mould cavity and molten plastics material flowing into the holding chamber contacts the part of the mould cavity immediately adjacent the feed port, where it starts to freeze before the piston forces the molten plastics material into the chamber.

Further, the piston face in this type of mould apparatus is typically internally cooled to cool with the rest of the mould wall, when the molten plastics material in the mould cavity is frozen. When the piston is withdrawn to refill the holding chamber for a following mould cycle, the molten plastics material that flows into the holding chamber contacts the cold piston face and begins to freeze. The partial freezing of the molten plastics material in some areas, prior to the piston filling the mould, increases the viscosity of the molten plastics material and thus requires higher feed pressure to fill the mould cavity and is prone to leaving marks on the moulded products.

The disadvantages of filling a large cross sectioned holding chamber adjacent the mould cavity, before urging the molten plastics material into the mould cavity, are ameliorated to some extent in the invention disclosed in U.S. Pat. No. 6,464,910, to Smorgon et al. This patent discloses a moulding cycle in which molten plastics material is fed to an accumulator, from where it is fed to the mould cavity at low pressure, via a large cross sectioned passage and wherein the feed port of the passage leading into the mould cavity is closed by a piston of a valve. The molten plastics material is thus not accumulated in a holding cavity immediately adjacent the mould, where some of the molten plastics material may have frozen.

However, in the Smorgon et al process, molten plastics material is fed continually from an extruder to the accumulator and from the accumulator to the mould cavity, so that there is no volumetric control over the quantity of molten plastics material fed to the mould cavity. Instead, the pressure within the mould cavity is measured. The result is that the mould cavity is filled completely before the piston of the valve starts to close the feed to the mould. The valve has large cross sectional dimensions and the advancement of the valve piston feeds a considerable volume of additional molten plastics material into the mould, thus causing over filling of the mould. Smorgon does not describe what happens to the overflow of molten plastics material fed to the mould, but it is presumably received in an overflow reservoir and goes to waste.

Further, in the Smorgon et al process, the molten plastics material is fed continuously under low pressure from the accumulator to the mould cavity until the mould cavity is full and the pressure in the mould increases. Only when this increase in pressure is detected, does the valve piston start its movement to close the mould. It can thus safely be assumed that the flow of the molten plastics material is momentarily interrupted before the valve piston movement starts. The interruption of the flow momentarily increases the residence time of the molten plastics material in the valve adjacent the mould and causes changes in the rheology of the plastics material. The valve piston then forces this material into the mould cavity, resulting in visible marks and/or local weakness within the product. Apart from the stagnation that occurs in the valve, the melt front velocity of molten plastics material that flows into the mould is also momentarily disrupted, which affects the physical properties and appearance of the moulded product.

One object of the present invention is to provide an improved moulding method and apparatus which allow molten plastics material to be fed uninterruptedly to a mould cavity through a large cross sectioned passage.

Another object of the present invention is to provide an improved moulding method and apparatus which limit wastage by limiting overfilling of a mould cavity with molten plastics material which is fed uninterruptedly to the cavity.

BRIEF DESCRIPTION OF THE INVENTION

According to one aspect of the present invention there is provided a method of moulding an article, said method comprising:
  feeding mouldable material into a metering cavity;
  feeding the mouldable material from the metering cavity into a mould cavity via a transition passage, the transition passage being defined adjacent the mould cavity; and
  urging some of the mouldable material from the transition passage into the mould cavity with a working stroke of a packing piston, until the packing piston closes a port defined between the transition passage and the mould cavity and a leading face of the packing piston forms part of the peripheral wall of the mould;
  wherein a predetermined quantity of the mouldable material is fed from the metering cavity into the mould cavity.

Less than ninety percent of the mould cavity may be filled with the mouldable material when the packing piston starts its working stroke.

The packing piston may start its working stroke while mouldable material is still being fed from the metering cavity and the packing piston may close an inlet into the transition passage from the metering cavity, during said working stroke.

The mouldable material may be fed from the metering cavity by a working stroke of a metering piston that is displaceable within the metering cavity and the displacement of the metering piston within the metering cavity may be monitored, to control the volume of mouldable material that is fed from the metering cavity.

The position of the packing piston relative to the port may be monitored at the end of the working stroke of the packing piston to determine if the mould cavity has been filled with a required quantity of mouldable material, i.e. to determine if it has been over-filled or under-filled, and the distance that the metering piston travels during a subsequent working stroke may be automatically adjusted to correct the quantity of mouldable material that is fed to the mould cavity from the metering cavity, i.e. to compensate for any over-filling or under-filling.

Instead, the mouldable material may be fed from the metering cavity to the mould cavity by a working stroke of a reciprocating injection moulding screw that is displaceable within the metering cavity.

The temperature of the walls of the transition passage and/or of the face of the packing piston may be controlled.

The mouldable material may be fed from a single metering cavity to multiple transition passages and from there to a single mould cavity or to multiple mould cavities. In the event that the mouldable material is urged into a single mould cavity from multiple transition passages, the packing pistons of the transition passages may perform their working strokes at different times.

Mouldable material may instead be fed from multiple metering cavities to a single mould cavity.

The mouldable material may comprise, at least in part, of a molten plastics material, or any other mouldable material.

According to another aspect of the present invention there is provided apparatus for moulding an article, said apparatus comprising:

a metering chamber and a displaceable member, together defining a metering cavity, the volume of said metering cavity being variable by reciprocal displacement of the displaceable member in the metering cavity and said metering cavity being connectable to a supply of mouldable material;

a packing chamber and a packing piston, together defining a transition passage that is in flow communication with an inner cavity of a mould via a port and that is in flow communication with the metering cavity via a passage, the packing piston being reciprocally displaceable within the transition passage between a retracted position and a forward position, the packing piston closing said port between the transition passage and the mould cavity and a leading face of the packing piston forming part of the peripheral wall of the mould cavity, when the packing piston is in said forward position;

wherein the volume of the metering cavity is configured to be varied by a predetermined amount, during the reciprocal displacement of the displaceable member.

The packing piston may be configured to start a working stroke from its retracted position to its forward position when less than ninety percent of the mould cavity is filled with mouldable material and may be configured to start its working stroke while mouldable material is still being fed from the metering cavity.

The displaceable member may be a metering piston or an injection moulding screw.

The packing piston may include means for controlling the temperature of its leading face and similarly, the packing chamber may include means for controlling the temperature of the transition passage.

The apparatus may define a metering cavity that is connected to multiple transition passages, which in turn may be in flow communication with multiple mould cavities or with a single mould cavity.

Instead, the apparatus may define multiple metering cavities that are connected via multiple transition passages to a single mould cavity.

BRIEF DESCRIPTION OF THE DRAWINGS

For a better understanding of the present invention, and to show how the same may be carried into effect, reference will now be made, by way of non-limiting example, to the accompanying drawings in which.

DETAILED DESCRIPTION OF THE DRAWINGS

Figure 1:
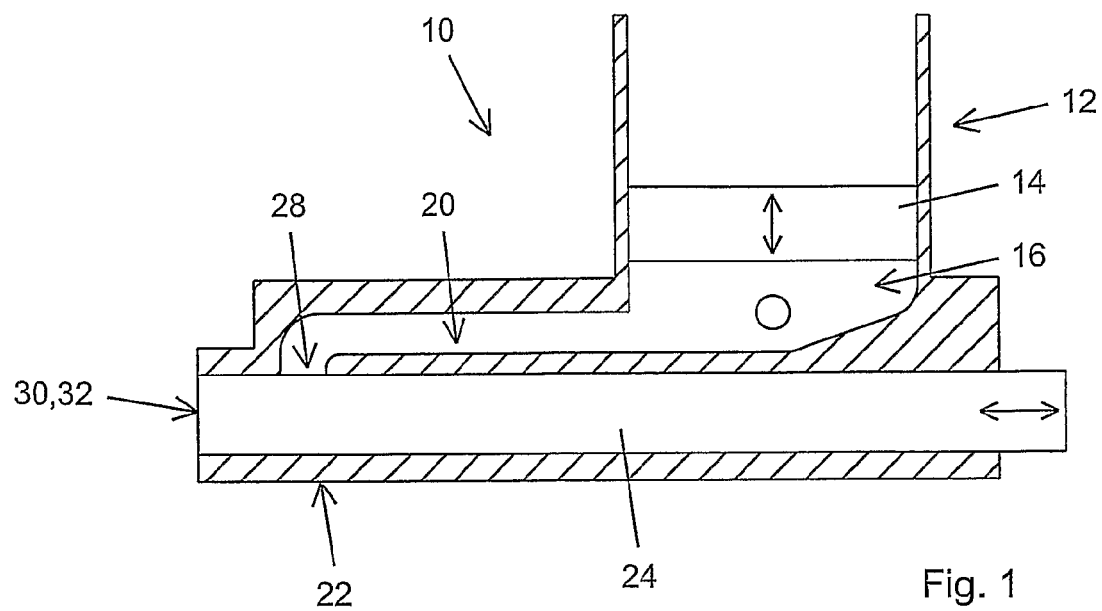
FIG. 1 is a section illustrating moulding apparatus in accordance with the present invention in a first operative condition.

Referring to the drawings, moulding apparatus in accordance with the invention is indicated generally by reference numeral 10. Some of the features of the apparatus 10 are only visible in some of the drawings.

The apparatus 10 comprises a metering chamber 12 within which there is a reciprocally displaceable member in the form of a metering piston 14, so that a metering cavity 16 of variable volume is defined inside the metering chamber. The metering cavity 16 has an inlet opening 18 that can be connected to a supply of molten plastics material, e.g. a heated pipe leading from an extruder or compounder, and has an outlet leading into a passage in the form of a melt flow path 20. The metering piston 14 is upwardly and downwardly displaceable between a fully down position shown in FIG. 1 and raised position shown in FIGS. 2 and 3 and is driven by external means such as a double acting hydraulic cylinder (not shown). The position and displacement of the metering piston 14 is monitored accurately and the height by which it is lifted to its raised position is accurately controlled, by using a digital potentiometer.

It would be appreciated by a person skilled in the art that the supply of molten plastics material may include a method of plasticizing and/or compounding the polymer and/or additives or reinforcing means as mentioned above and this can be achieved by using different types of screws, such as single or twin screws, continuous, intermittently or of a stop/start type, etc.

The metering cavity 16 can be substituted by a conventional reciprocating injection moulding screw which would provide a metered quantity of molten plastics material to the mould cavity. However, a conventional moulding screw is optimised for plasticizing and not for strokeability or measurement, whereas a metering piston 24 as described above, can have a stroke length to diameter ratio of up to 20:1, giving exceptional metering accuracy.

The apparatus further comprises a packing chamber 22 in the form of a barrel within which there is a reciprocally displaceable packing piston 24, so that a cavity in the form of a transition passage 26 (as can best be seen in FIG. 3) is defined within the packing chamber. The packing chamber 22 defines an inlet 28 in its walling, from the melt flow path 20 into the transition passage.

The transition passage 26 is defined immediately adjacent the mould cavity (not shown) and is open to the mould cavity, so that a port 30 is defined where the transition passage opens into the mould cavity. The mould defining the mould cavity has been omitted form the drawings as it is a cavity that can have an unlimited number of shapes and dimensions and it is thus not readily capable of being illustrated. It will be clear to those skilled in the art that the mould cavity will, in use, be immediately to the left of the transition passage 26, as illustrated.

Figure 2:
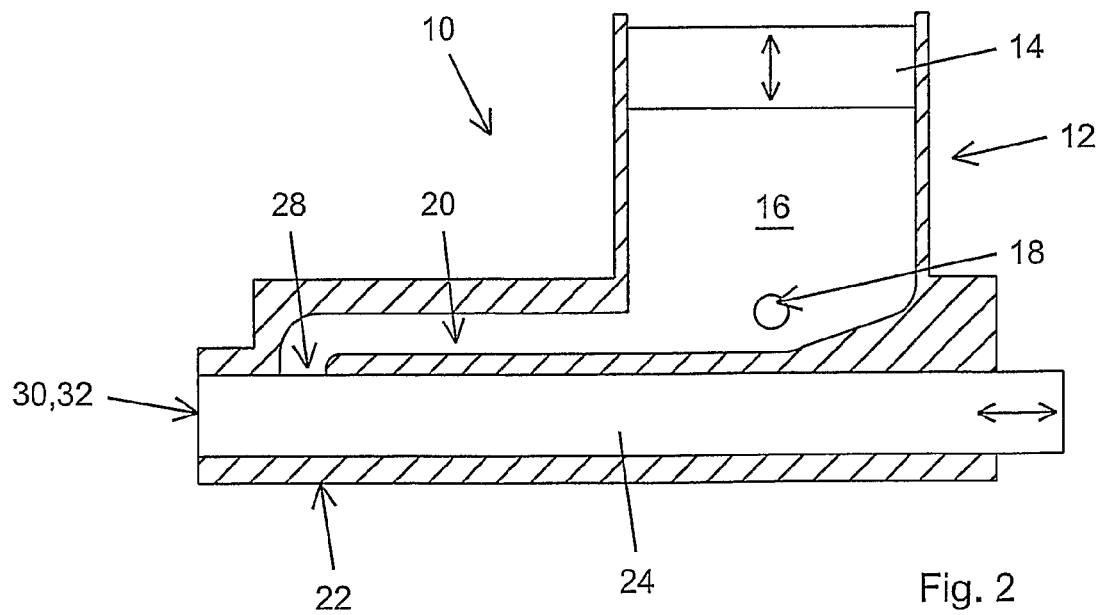
FIGS. 2 and 3 are views similar to that of FIG. 1 and illustrating, with FIG. 1, the operating cycle of the apparatus.
Figure 3:
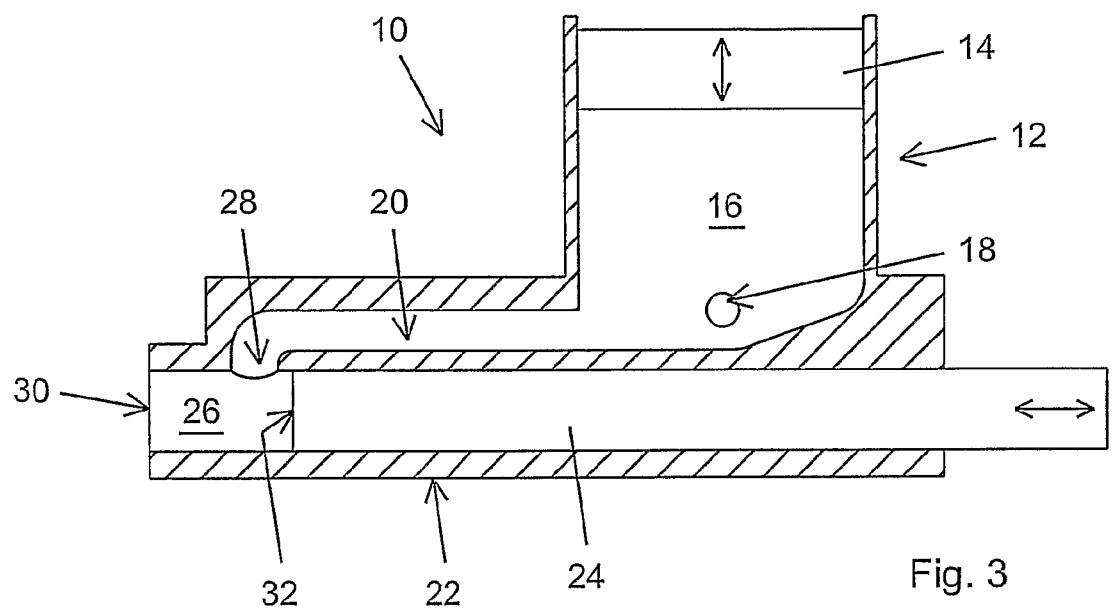

The packing piston 24 is driven externally, e.g. by a double acting hydraulic piston, to be displaceable between a retracted position shown in FIG. 3 and a forward position shown in FIGS. 1 and 2. When the packing piston 24 is in its forward position, it closes the port 30 between the transition passage 26 and the mould cavity, and a leading face 32 of the packing piston forms part of the peripheral wall of the mould cavity. The packing piston 24 also closes the inlet 28, when in its forward position. When the packing piston 24 is retracted, the inlet 28 and the port 30 are open and the inlet 28 is spaced a small distance from the piston's leading face 32.

Those skilled in the art would appreciate that the movements of the metering piston 14 and packing piston 24 can be controlled in a number of ways, e.g. by using hydraulics with linear encoders and proportional control valves, hydraulically driving with electrically adjustable threaded stops, recirculating ball screws operated by servo motors, linear motors, or the like.

In use, when the mould cavity is filled with molten plastics material that can freeze to form a moulded article or part, the apparatus is in the condition shown in FIG. 1, with the packing piston 24 in its forward position and the metering piston in its fully down position.

While the molten plastics material in the mould cavity freezes, the metering cavity 16 is filled with molten plastics material that enters the metering cavity via the inlet opening 18 and the metering piston 14 gradually lifts to increase the volume of the metering cavity to accommodate the inflow, until the apparatus 10 is in the condition shown in FIG. 2, in which the metering piston 14 is at a predetermined raised position, so that a predetermined metered volume can be displaced by the metering piston between its raised and fully down positions. The metering cavity 16 thus receives molten plastics material even while the material in the mould cavity is still freezing, thus keeping the cycle time for the moulding process short.

Once the plastics material in the mould cavity has frozen, the mould is opened and the article ejected. The mould then re-closes and the mould cavity is ready to be filled with molten plastics material to make another article in a next cycle of operation, the packing piston 24 is withdrawn to its position shown in FIG. 3, to open the inlet 28 and the port 30.

The metering piston 14 is lowered a predetermined distance from its raised position to its fully down position, so that the predetermined metered volume of molten plastics material is displaced by the metering piston, from the metering cavity 16, via the melt flow path 20 and the inlet 28, into the transition passage 26, from where it flows uninterrupted through the port 30 into the mould cavity. The volume of molten plastics material fed from the metering cavity 16 during this stroke of the metering piston 14, generally equals the volume required to make an optimised quality article in the mould cavity.

While the metering piston 14 moves downwardly, the molten plastics material flows continuously and uninterrupted from the metering cavity 16 to the mould cavity, so that the residence time of the plastics material in the transition passage 26 is kept to a minimum.

While the metering piston 14 is still travelling downwardly, but is nearing its fully down position, the packing piston 24 starts a working stroke from its retracted position, towards the port 30. When the packing piston 24 reaches the inlet 28, it closes it. In the illustrated embodiment of the invention, the packing piston 24 first travels a short distance from its retracted position, before it reaches the edge of the inlet 28 and starts closing the inlet. This is not essential, but it allows the packing piston 24 to accelerate and start displacing molten plastics material from the transition passage 26 and allows the metering piston 14 to reach its fully down position so that flow in the melt flow path 20 stops, before the packing piston reaches the inlet 28. The apparatus 10 is configured so that the metering piston 14 reaches its bottom position just as the packing piston 24 is about to start closing the inlet 28.

The metered volume displaced by the metering piston 14 generally equals the volume of the mould cavity, while the volume of the transition passage 26 is made as small as possible. However, the cross section of the transition passage 26 should preferably be large for reasons provided above and the length of the packing piston's stroke cannot be smaller than what is allowed by physical constraints such as the thickness of the mould wall, the diameter of the melt flow path 20, etc. The volume of the transition passage 26 is preferably about ten percent to forty nine percent of the metered volume and it follows that the mould cavity is filled about fifty one percent to ninety percent with molten plastics material that is fed by movement of the metering piston, before the last ten to forty nine percent of the mould cavity is filled by material fed by movement of the packing piston.

The overlapping reciprocal movements of the metering piston 14 and the packing piston 24 causes the flow of molten plastics material from the transition passage 26 into the mould, to be continuous and thus maintains the melt front velocity as the material flows into the mould cavity. The flow may be accelerated momentarily when both the pistons 14,24 are moving, but this is generally inconsequential. What is important, is that the flow of molten plastics material does not stagnate in the transition passage 26 and that the residence time of molten material in the transition passage is kept to a minimum. The uninterrupted flow of material during the process is especially beneficial when moulding materials that can be adversely affected by long residence times during the injection cycle.

Keeping the residence time of plastics material in the transition passage 26 to a minimum, is advantageous since the face 32 of the packing piston 24 and the walls of the transition passage 26 adjacent the mould cavity may be cooler than the internal walls of the metering cavity 16 and the melt flow path 20, owing to thermal losses that occur when the walls of the mould cavity (including the piston face 32) are cooled to form an article in the mould. In preferred embodiments of the invention, the piston face 32 and/or the packing chamber 22 can be cooled and/or heated separately and independently and can be kept at temperatures that differ from those of the cooled walls of the mould cavity. Those skilled in the art would appreciate that all the apparatus 10 would normally be heated and/or cooled, as desired, to keep the apparatus at temperatures at which the plastics material remains molten, but at which thermal degradation is kept to a minimum. However, the outer walls of the mould (which could include the piston face 32 in embodiments where cooling has been provided for the piston face) have to be cooled to freeze molten plastics material in the mould cavity and thermal losses from parts of the apparatus immediately adjacent the mould, are practically inevitable.

The stroke of the packing piston 24, which could be cooled internally, should preferably be kept as short as possible in order to limit degradation and get the best surface finish. The ratio of the length to the diameter of the packing piston 24 could be in the range of 7:1.

When the packing piston 24 reaches its forward position, its face 32 forms part of the mould wall and the molten plastics material in the mould can be allowed to freeze. The apparatus 10 is now again as shown in FIG. 1 and the cycle is complete. During the start of the moulding cycle, the mould can be slightly open and can start to close during or after the working stroke of the packing piston, similar to conventional injection compression moulding techniques, although in most cases, the mould would be closed at the start of the injection cycle.

The position of the packing piston 24 relative to the port 30 is monitored at the stage when it reaches its forward position, to monitor the extent of filling of the mould cavity with the volume of molten plastics material fed from the metering cavity. The stroke of the metering piston 14, i.e. the height to which it is raised in the following operational cycle can be automatically adjusted to correct over or under filling of the mould cavity in relation to the stopping position of the packing piston in its forward stroke.

The inlet opening 18, melt flow path 20, inlet 28, transition passage 26 and port 30 are all of cross sectional diameters that far exceed the diameters of the narrow sprues, runners and gates of conventional injection moulding apparatus. The size of the port 30 is at lest twice that of the gate in conventional injection moulding equipment. As a result, the melt velocity of the molten plastics material at the port 30 is at least 10 times less than what is the case in an optimised conventional injection moulding process. Further, the time required to fill the mould cavity is less than half that required to fill a mould cavity in a conventional injection moulding process and because filling happens so much faster, the temperature of the front face 32 of the packing piston 24 can be controlled in such a way as to get the most optimal surface finish and/or properties in the moulded part, which could lead to a decrease in total cycle time as well as a decrease in the dimensional instability (warping) of moulded articles. The working stroke of the packing piston 24 should preferably be kept as short as possible in order to limit degradation and get the best surface finish.

An additional benefit of this low shear moulding process through a large gate is that thinner in-mould decorative skins and other layers can be used that would not be pierced as easily as what can be observed in conventional injection moulding processes. The other in-mould layers can include fibre mats, PET, metal, textiles, or the like.

The moulding of long glass fibres with an average length in excess of 4 mm in a polyolefin matrix can be achieved by using the method of the present invention, due to the uninterrupted, minimal restrictive passages or gates that the composite has to move through before entering the mould.

In conventional injection moulding there is a direct relation between the weight of material fed to a mould cavity (i.e. the shot weight) and the clamping force required to keep the mould closed. The present invention allows the shot volume to be increased in relation to the clamping force required and therefore allows a smaller extruder to be used with a 100% duty cycle to supply two moulds with molten plastics material, whether virgin material or recycled material.

Low melt fracture index (MFI) materials can be moulded by the method of the present invention with a reduced likelihood of getting under-filling of the mould cavity (referred to as "short shots"). Further, since the rate at which material is being fed into the mould cavity is being controlled, dilitant materials can be moulded using the present invention. Temperature sensitive materials such as wood fibre or fillers can also be moulded to a ⅔ dimensional geometry due to the very low shearing and minimal increased heat.

The present invention can be implemented in many different configurations with single, multiple and/or branched product streams. In particular, a single metering piston 14 or plasticizing screw can be used to supply metered quantities of molten plastics material to multiple transition passages 26, opening into a single mould cavity or into multiple mould cavities. Further, the packing pistons 24 can be configured and controlled to perform their working strokes at different times. This will allow the formation of weld lines that are formed when material fed from different transition passages 26 meet in the mould cavity, to be controlled and/or predicted. The packing pistons 24 can be cascaded to allow the mould cavity to be filled rapidly with reduced pressure.

In an alternative embodiment, different molten materials can be supplied from different metering cavities and can be fed into the mould cavity in predetermined locations and/or in a predetermined sequence. This allows the use of different materials in different parts or moulded articles, the use of different materials in a laminated configuration within the moulded product e.g. to provide a good surface finish with a different material used underneath a surface layer, etc. In these embodiments of the invention, the exact volume of each material that is fed to the mould cavity and the rate of flow must be controlled accurately, as allowed by the present invention, since it affects the properties of the moulded articles. There is thus no limit to the number of different materials that could be fed to the mould cavity, other than limitations of the dimensions of the metering chamber, the moulding unit, the length of the transition passage and hot runner, and the like.

The present invention allows for the productivity of plasticizing units that supply molten plastic material to moulding units, to be optimised, by using a single plasticizing unit to supply molten material to different moulding units, each with its own apparatus 10, moulds, clamping apparatus etc. The molten material from the plasticizing unit can be fed continually to all the metering cavities 16 of the different moulding units, instead of feeding material intermittently as is done in conventional injection moulding. This allows for the use of smaller plasticizing units and/or lower energy consumption in the plasticizing units.

The invention claimed is:

1. A method of moulding an article, said method comprising:

feeding mouldable material into a metering cavity;

feeding the mouldable material from the metering cavity into a mould cavity via a transition passage, the transition passage being defined adjacent the mould cavity; and urging some of the mouldable material from the transition passage into the mould cavity with a working stroke of a packing piston, until the packing piston closes a port defined between the transition passage and the mould cavity and a leading face of the packing piston forms part of the peripheral wall of the mould;

characterised in that a known, predetermined, metered volume of the mouldable material is fed from the metering cavity by a working stroke of a metering piston that is displaceable within the metering cavity, into the mould cavity and the displacement of the metering piston within the metering cavity is monitored to control the volume of mouldable material that is fed from the metering cavity, further characterised in that the packing piston starts its working stroke while mouldable material is still being fed from the metering cavity, such that an uninterrupted flow of mouldable material in the transition passage is maintained.

2. A method as claimed in claim 1, characterised in that less than ninety percent of the mould cavity is filled with the mouldable material when the packing piston starts its working stroke.

3. A method as claimed in claim 1, characterised in that the packing piston closes an inlet into the transition passage from the metering cavity, during said working stroke.

4. A method as claimed in claim 1, characterised in that the position of the packing piston relative to the port is monitored at the end of the working stroke of the packing piston to determine if the mould cavity has been filled with a required quantity of mouldable material, and the distance that the metering piston travels during a subsequent working stroke is automatically adjusted to correct the quantity of mouldable material that is fed to the mould cavity from the metering cavity.

5. A method as claimed in claim 1, characterised in that the temperature of the walls of the transition passage is controlled.

6. A method as claimed in claim 1, characterised in that the temperature of the face of the packing piston is controlled.

7. A method as claimed in claim 1, characterised in that the mouldable material is fed from a single metering cavity to multiple transition passages.

8. A method as claimed in claim 7, characterised in that the mouldable material is fed from the multiple transition passages to a single mould cavity.

9. A method as claimed in claim 7, characterised in that the mouldable material is fed from the multiple transition passages to multiple mould cavities.

10. A method as claimed in claim 1, characterised in that the mouldable material is urged into a single mould cavity from multiple transition passages and the packing pistons of the transition passages perform their working strokes at different times.

11. A method as claimed in claim 1, characterised in that mouldable material is fed from multiple metering cavities to a single mould cavity.

12. A method as claimed in claim 1, characterised in that the mouldable material comprises, at least in part, of a molten plastics material.

13. Apparatus for moulding an article, said apparatus comprising:
a metering chamber and a displaceable member, together defining a metering cavity, the volume of said metering cavity being variable by reciprocal displacement of the displaceable member in the metering cavity and said metering cavity being connectable to a supply of mouldable material;
a packing chamber and a packing piston, together defining a transition passage that is in flow communication with an inner cavity of a mould via a port and that is in flow communication with the metering cavity via a passage, the packing piston being reciprocally displaceable within the transition passage between a retracted position and a forward position, the packing piston closing said port between the transition passage and the mould cavity and a leading face of the packing piston forming part of the peripheral wall of the mould cavity, when the packing piston is in said forward position;
characterised in that the displaceable member is a metering piston and the volume of the metering cavity is configured to be varied by a known, predetermined amount, during the reciprocal displacement of the metering piston, further characterised in that the packing piston is configured to start its working stroke while mouldable material is still being fed from the metering cavity, such that an uninterrupted flow of mouldable material in the transition passage is maintained.

14. Apparatus as claimed in claim 13, characterised in that the packing piston is configured to start a working stroke from its retracted position to its forward position when less than ninety percent of the mould cavity is filled with mouldable material.

15. Apparatus as claimed in claim 13, characterised in that the packing piston includes means for controlling the temperature of its leading face.

16. Apparatus as claimed in claim 13, characterised in that the packing chamber includes means for controlling the temperature of the transition passage.

17. Apparatus as claimed in claim 13, characterised in that it defines a metering cavity that is connected to multiple transition passages.

18. Apparatus as claimed in claim 17, characterised in that the multiple transition passages are in flow communication with multiple mould cavities.

19. Apparatus as claimed in claim 17, characterised in that the multiple transition passages are in flow communication with a single mould cavity.

20. Apparatus as claimed in claim 13, characterised in that it defines multiple metering cavities that are connected via multiple transition passages to a single mould cavity.

* * * * *